United States Patent
Wang et al.

(10) Patent No.: US 8,415,912 B2
(45) Date of Patent: Apr. 9, 2013

(54) MACHINE MOTION CONTROL SYSTEM

(75) Inventors: Jia-Bin Wang, Shenzhen (CN);
Hua-Yong Xu, Shenzhen (CN);
Guo-Jun Yu, Shenzhen (CN);
Teng-Tsung Huang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 354 days.

(21) Appl. No.: 12/885,663

(22) Filed: Sep. 20, 2010

(65) Prior Publication Data

US 2011/0288686 A1    Nov. 24, 2011

(30) Foreign Application Priority Data

May 21, 2010    (CN) .......................... 2010 1 0180322

(51) Int. Cl.
*G05B 11/01*    (2006.01)
(52) U.S. Cl. ........................................ 318/560; 348/187
(58) Field of Classification Search .................. 318/569, 318/600, 567, 560; 348/187
See application file for complete search history.

(56) References Cited

U.S. PATENT DOCUMENTS

| | | | | |
|---|---|---|---|---|
| 6,366,312 | B1 * | 4/2002 | Crittenden | 348/187 |
| 6,381,809 | B2 * | 5/2002 | Uneme et al. | 16/342 |
| 7,486,309 | B2 * | 2/2009 | Knoedgen et al. | 348/187 |
| 2007/0182711 | A1 * | 8/2007 | Grant et al. | 345/156 |
| 2007/0299362 | A1 * | 12/2007 | Epley et al. | 600/559 |
| 2009/0312009 | A1 * | 12/2009 | Fishel | 455/425 |

* cited by examiner

*Primary Examiner* — Rina Duda
(74) *Attorney, Agent, or Firm* — Altis Law Group, Inc.

(57) ABSTRACT

An exemplary embodiment of machine motion control system for testing electronic devices includes a machine and a control module electrically connected to the machine. The machine secures the electronic devices and includes a sensing unit and a servo unit, the sensing unit obtains different test parameters of the electronic devices to generate corresponding sensed signal. The control module includes a signal conversion unit electrically connected to the sensing unit and a main control circuit, the main control circuit is electrically connected to the signal conversion unit and the servo unit. The signal conversion unit converts the sensed signal into corresponding command signal, and the main control circuit drives and controls the servo unit to adjust the motion state and test strength on the electronic device according to the command signal.

8 Claims, 2 Drawing Sheets

MACHINE MOTION CONTROL SYSTEM

BACKGROUND

1. Technical Field

The disclosure generally relates to machine motion control systems, and more particularly relates to, a machine motion control system for testing the mechanical strength of electronic devices.

2. Description of the Related Art

In the manufacturing process, notebooks, mobile phones and other electronic devices need different tests, such as surface pressure tests, torsion tests and pull tests, to test their mechanical strength. Generally, a machine motion control system is used to control a servo device, such as a motor, to test the electronic devices and obtain different test parameters.

However, in use, the machine motion control system may not accurately control the test strength and the motion trace of the servo device, which may damage the electronic devices and the servo device, and cannot obtain accurate test results.

Therefore, there is room for improvement within the art.

BRIEF DESCRIPTION OF THE DRAWINGS

Many aspects of an exemplary machine motion control system can be better understood with reference to the following drawings. The components in the drawings are not necessarily drawn to scale, the emphasis instead being placed upon clearly illustrating the principles of the exemplary machine motion control system. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
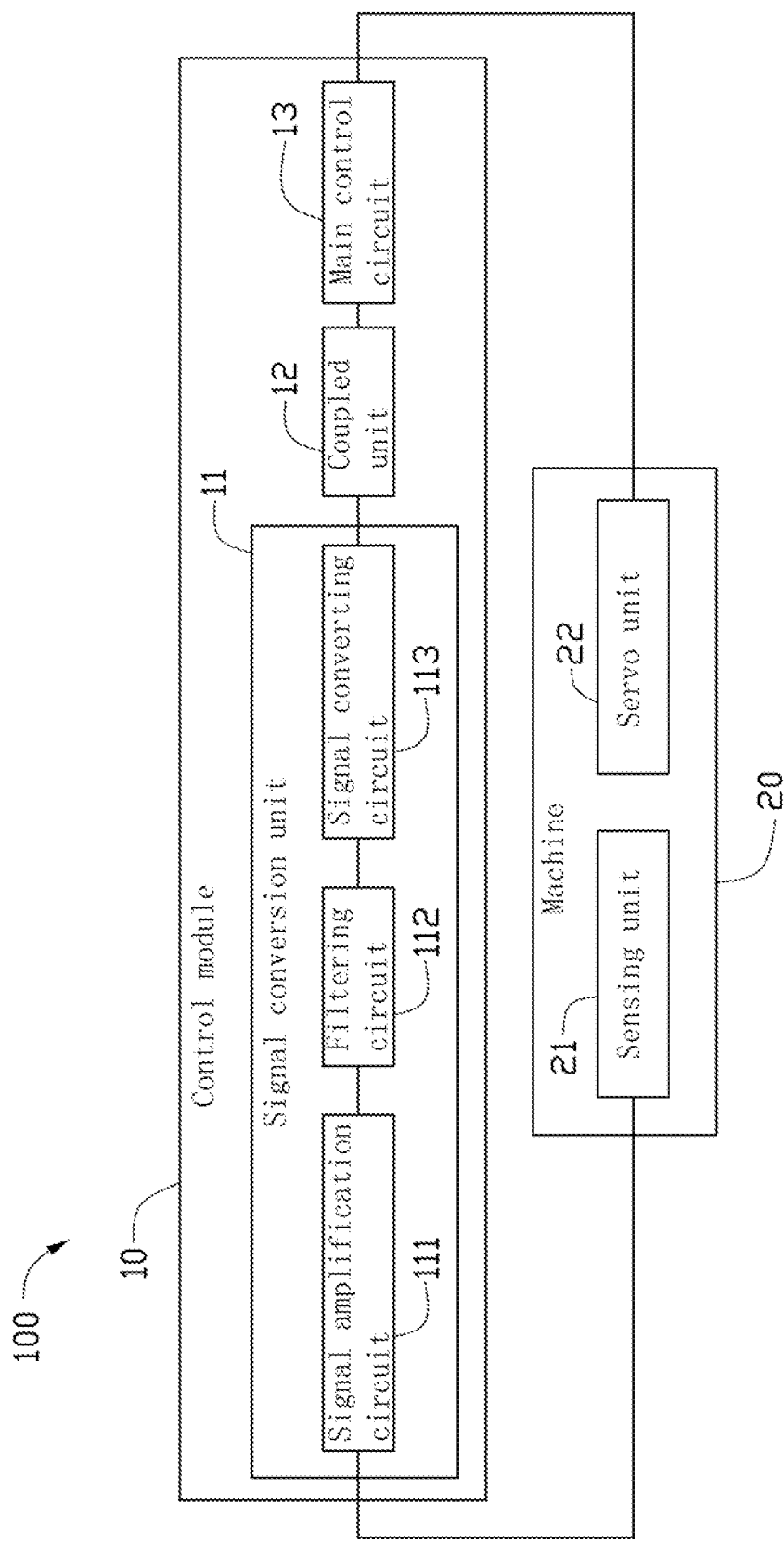
FIG. 1 is a block diagram of a machine motion control system including a control module and a machine, according to an exemplary embodiment.

FIG. 1 shows a machine motion control system 100 used for strength testing of an electronic device, such as a notebook, or a mobile phone. The machine motion control system 100 includes a control module 10 and a machine 20 electrically connected to the control module 10. The control module 10 includes a signal conversion unit 11, a coupled unit 12, and a main control circuit 13. The machine 20 is for holding and securing the electronic devices and includes a sensing unit 21 and a servo unit 22. The sensing unit 21, the signal conversion unit 11, the coupled unit 12, the main control circuit 13 and the servo unit 22 are consecutively electrically connected.

The sensing unit 21 can be an existing load cell and contacts the corresponding electronic device. The sensing unit 21 is capable of sensing different test parameters of the electronic device, such as pressure parameters, torsion parameters, or pull parameters, and generating corresponding sensed signals. For example, when the electronic device is tested, accordingly the sensing unit 21 distorts under the external force, resulting in the voltage changes of the sensing unit 21, so the pressure strength can be obtained according to the voltage changes of the sensing unit 21.

Figure 2:
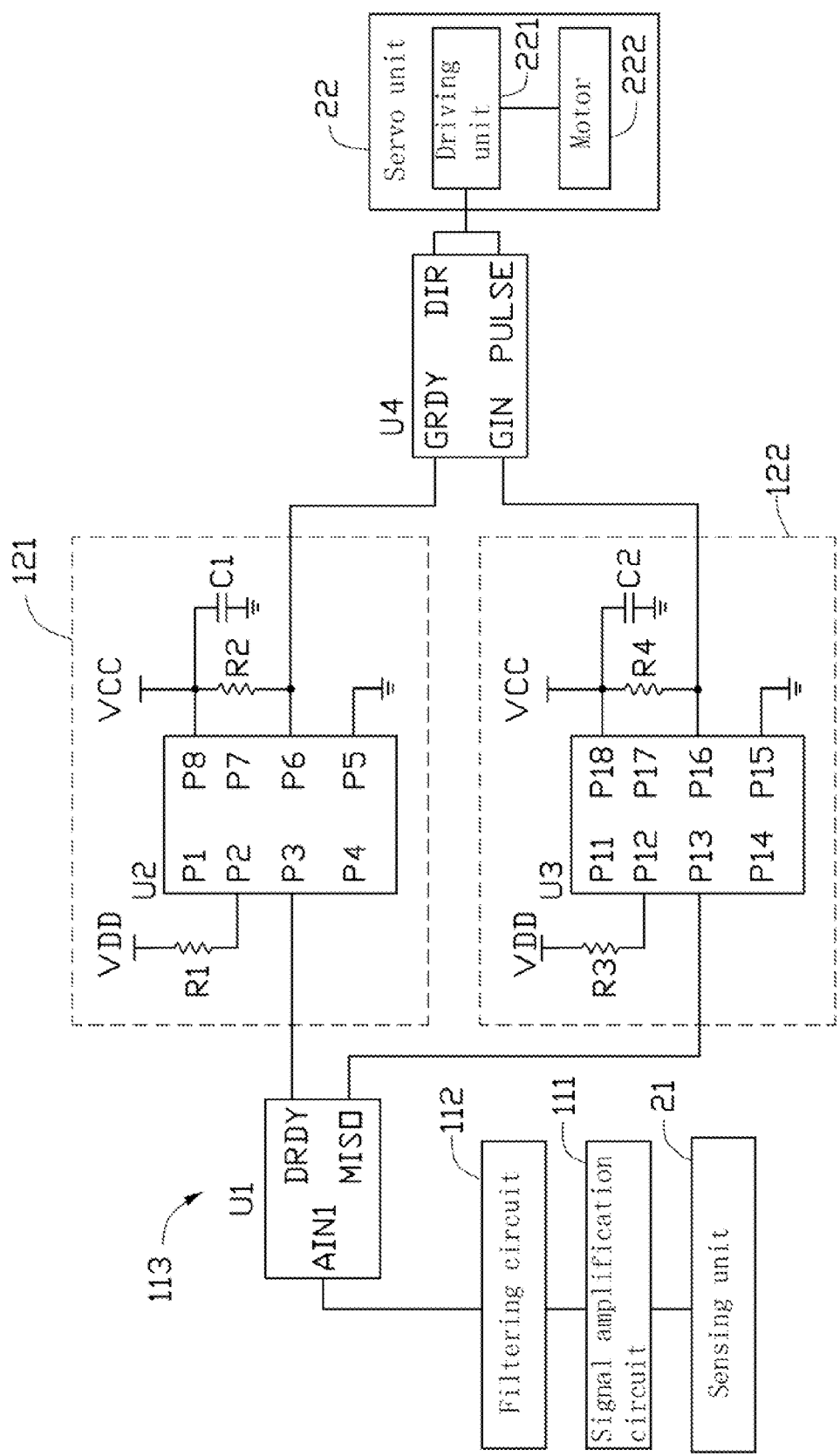
FIG. 2 is a circuit view of the control module and the machine of the machine motion control system shown in FIG. 1.

Also referring to FIG. 2, the signal conversion unit 11 is capable of receiving the sensed signals from the sensing unit 21 and converting the sensed signals into corresponding command signals. The signal conversion unit 11 can be a normal analog/digital (A/D) converter and includes a signal amplification circuit 111, a filtering circuit 112 and a signal converting circuit 113. The signal amplification circuit 111, the filtering circuit 112 and the signal converting circuit 113 are consecutively electrically connected.

The signal amplification circuit 111 can be an existing signal amplifier and is electrically connected to the sensing unit 21. The signal amplification circuit 111 is capable of receiving and amplifying the sensed signals from the sensing unit 21. The filtering circuit 112 can be an existing signal filter and is capable of receiving the amplified sensed signals from the signal amplification circuit 111 and filtering clutter among the sensed signals to avoid signal interference.

The signal converting circuit 113 is electrically connected to the coupled unit 12 and includes an A/D converting chip U1. The A/D converting chip U1 may be an ADS1256 chip and includes a signal input port AIN1, a first signal output port DRDY, and a second signal output port MISO. The signal input port AIN1 is electrically connected to the filtering circuit 112, and is capable of receiving the sensed signals from the filtering circuit 112 and converting the sensed signals into corresponding command signals, such as digital signals. The first signal output port DRDY is an enable port and is low level activated. Thus, when the first signal output port DRDY is low, the second signal output port MISO is enabled and outputs corresponding command signals.

The coupled unit 12 is capable of improving the signal to noise ratio (SNR) and anti jamming capability of the command signals and includes a first coupled circuit 121 and a second coupled circuit 122. The first coupled circuit 121 includes a first optical coupler chip U2, which may be a HCPL0600 chip. The first optical coupler chip U2 includes eight pins P1-P8. The pins P1, P4, and P7 are in floating state, the second pin P2 is electrically connected to a first power source VDD through a first resistor R1. The third pin P3 is electrically connected to the first signal output port DRDY of the A/D converting chip U1 to isolate output signals from the first signal output port DRDY. The fifth pin P5 is electrically connected to ground, and the sixth pin P6 is electrically connected to a second power source VCC through a second resistor R2. The eighth pin P8 is electrically connected to ground through a first capacitor C1 and is electrically connected to the second power source VCC.

The second coupled circuit 122 includes a second optical coupler chip U3, which may be a HCPL0600 chip. The second optical coupler chip U3 includes eight pins P11-P18. The pins P11, P14, and P17 are floating, the second pin P12 is electrically connected to the first power source VDD through a third resistor R3. The third pin P13 is electrically connected to the second signal output port MISO of the A/D converting chip U1 to isolate output signals from the second signal output port MISO. The fifth pin P15 is electrically connected to ground and the sixth pin P16 is electrically connected to the second power source VCC through a fourth resistor R2. The eighth pin P18 is electrically connected to ground through a second capacitor C2 and is electrically connected to the second power source VCC.

The main control circuit 13 includes a main control chip U4, which can be an existing MCX305 chip. The main control chip U4 includes a first coupled signal input port GRDY, a second coupled signal input port GIN, a first control port DIR, and a second control port PULSE. The first coupled signal input port GRDY is electrically connected to the pin P6, and the second coupled signal input port GIN is electrically connected to the pin P16. The first coupled signal input port GRDY is an enable port and is low level activated. Thus, when the first coupled signal input port GRDY is low, the second coupled input port GIN is enabled and receives the output command signals from the pin P16 of the second optical coupler chip U3. Accordingly, the corresponding parameters of the command signals are adjusted, such as amplitude, frequency, and pulse, and are transmitted from the first control port DIR and the second control port PULSE to the servo unit 22.

The servo unit 22 includes a driving unit 221 and a motor 222 electrically connected to the driving unit 221. The driving unit 221 is electrically connected to the first control port DIR and the second control port PULSE and is capable of receiving the command signals from the first control port DIR and the second control port PULSE to drive the motor 222. Thus, the motor 222 drives corresponding measuring devices (not shown) mechanically connected to the motor 222 to test the laptops, mobile phones or other electronic devices placed on the machine 20 or the measuring devices.

In use, the sensing unit 21 senses different test parameters, such as pressure parameters, torsion parameters or pull parameters, of different electronic devices and generates a corresponding sensed signal. The signal conversion unit 11 receives, filters, and converts the sensed signal into a corresponding command signal, and is transmitted to the coupled unit 12. The coupled unit 12 isolates and couples the command signal and transmits the coupled command signal to the main control circuit 13. The main control circuit 13 receives the coupled command signal and drives the servo unit 22 under the control of the command signal to test the electronic device placed on the machine 20 or the measuring devices.

In summary, in the machine motion control system 100 of the exemplary embodiment, the sensing unit 21 can sense the strength state of the tested electronic devices in real-time, the signal conversion unit 11 converts the strength signal into corresponding command signals. In addition, the command signals are isolated and coupled by the coupled unit 12, therefore, the main control circuit 13 can drive the servo unit 22 controlled by the command signals to test the electronic devices accurately, which may have better test results.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A machine motion control system for testing electronic device, comprising:
   a machine for securing the electronic device, and the machine comprising a sensing unit and a servo unit, the sensing unit for obtaining different test parameters of the electronic device to generate a corresponding sensed signal; and
   a control module electronically connected to the machine, the control module comprising:
      a signal conversion unit electrically connected to the sensing unit, the signal conversion unit comprising an analog/digital converting chip, the analog/digital converting chip comprising:
         a first input connected to the sensing unit;
         a first signal output port; and
         a second signal output port;
      a coupled unit, the coupled unit comprising:
         a first coupled circuit, the first coupled circuit comprising a first optical coupler chip electrically connected to the first signal output port; and
         a second coupled circuit; the second coupled circuit comprising a second optical coupler chip electrically connected to the second signal output port; and
      a main control circuit electrically connected to the signal conversion unit and the servo unit; wherein the signal conversion unit processes and converts the sensed signal into a corresponding command signal, the coupled unit improves the signal to noise ratio and anti jamming capability of the command signal, and the main control circuit receives the command signal from the coupled unit, drives and controls the servo unit to adjust the motion state and test strength on the electronic device according to the command signal.

2. The machine motion control system as claimed in claim 1, wherein the sensing unit is a load cell and the load cell mechanically contacts the corresponding electronic device to sense different test parameters of the electronic device and generate corresponding sensed signal.

3. The machine motion control system as claimed in claim 1, wherein the signal conversion unit comprises a signal amplification circuit electrically connected to the sensing unit, and the signal amplification circuit receives and amplifies the sensed signal from the sensing unit.

4. The machine motion control system as claimed in claim 3, wherein the signal conversion unit further comprises a filtering circuit electrically connected to the signal amplification circuit, and the filtering circuit receives the amplified sensed signal from the signal amplification circuit and filtering clutter among the sensed signal.

5. The machine motion control system as claimed in claim 4, wherein the signal conversion unit further comprises a signal converting circuit, the signal converting circuit comprises an analog/digital converting chip, and the analog/digital converting chip comprises a signal input port, the signal input port is electrically connected to the filtering circuit, and converts the sensed signals into corresponding command signals.

6. The machine motion control system as claimed in claim 1, wherein the main control circuit comprises a main control chip, the main control chip comprises a first coupled signal input port, a second coupled signal input port, a first control port, and a second control port, and the first coupled signal input port is electrically connected to the first optical coupler chip, the second coupled signal input port is electrically connected to the second optical coupler chip.

7. The machine motion control system as claimed in claim 6, wherein the first coupled signal input port is an enable port and is low level activated, and when the first coupled signal input port is low, the second coupled input port is enabled and receives the outputted command signals from the second optical coupler chip.

8. The machine motion control system as claimed in claim 1, wherein the servo unit comprises a driving unit and motor electrically connected to the driving unit, the driving unit is electrically connected to the first control port and the second control port, and the driving unit receives the command signals from the first control port and the second control port to drive and control the motor.

* * * * *